US010051554B2

(12) United States Patent
Jeong et al.

(10) Patent No.: US 10,051,554 B2
(45) Date of Patent: Aug. 14, 2018

(54) METHOD OF ACTIVE SCANNING AND ASSOCIATING BASED ON CONFIGURATION INFORMATION

(71) Applicant: KT Corporation, Seongnam-si (KR)

(72) Inventors: Yang Seok Jeong, Seoul (KR); Joo Young Kim, Seoul (KR)

(73) Assignee: KT Corporation, Seongnam-si (KR)

( * ) Notice: Subject to any disclaimer, the term of this patent is extended or adjusted under 35 U.S.C. 154(b) by 37 days.

(21) Appl. No.: 14/405,955

(22) PCT Filed: Jun. 5, 2013

(86) PCT No.: PCT/KR2013/004945
§ 371 (c)(1),
(2) Date: Dec. 5, 2014

(87) PCT Pub. No.: WO2013/183931
PCT Pub. Date: Dec. 12, 2013

(65) Prior Publication Data
US 2015/0146568 A1    May 28, 2015

(30) Foreign Application Priority Data

Jun. 7, 2012   (KR) .................. 10-2012-0061023
Nov. 15, 2012  (KR) .................. 10-2012-0129182
Mar. 12, 2013  (KR) .................. 10-2013-0025978

(51) Int. Cl.
*H04W 48/14*   (2009.01)
*H04L 12/24*   (2006.01)
(Continued)

(52) U.S. Cl.
CPC ......... *H04W 48/14* (2013.01); *H04L 41/0853* (2013.01); *H04L 43/10* (2013.01); *H04W 48/16* (2013.01)

(58) Field of Classification Search
CPC ..................... H04L 41/0859; H04W 48/14
See application file for complete search history.

(56) References Cited

U.S. PATENT DOCUMENTS

| 7,587,467 B2 | 9/2009 | Hesselink et al. |
| 2005/0171720 A1 | 8/2005 | Olson et al. |

(Continued)

FOREIGN PATENT DOCUMENTS

| EP | 2373092 A2 | 10/2011 |
| JP | 2006525748 A | 11/2006 |

(Continued)

OTHER PUBLICATIONS

Jarkko Kneckt et al., Active Scanning Related Requirements for Specification Frame Work Document, IEEE P802.11 Wireless LANs, doc.: IEEE 802.11-12/0207r1, Mar. 9, 2012, 4 pages.

(Continued)

Primary Examiner — Hassan Kizou
Assistant Examiner — Deepa Belur
(74) Attorney, Agent, or Firm — Sughrue Mion, PLLC

(57) ABSTRACT

Provided is a method of active scanning and associating based on configuration information, which can enable quick search for an access point (AP) and quick connection with a desired AP. The method includes transmitting, to an AP, a probe request frame including revision information of a current configuration, and receiving, from the AP, a probe response frame including the current configuration's revision information and/or updated configuration if any change has been occurred in a configuration designated by the prior revision information. Accordingly, when there are a plurality of terminals and APs, radio channel use efficiency can be improved by reducing the number and the length of unnecessary probe request frames and probe response frames to search for the AP.

12 Claims, 8 Drawing Sheets

(51) Int. Cl.
*H04L 12/26* (2006.01)
*H04W 48/16* (2009.01)

(56) References Cited

U.S. PATENT DOCUMENTS

| | | | | |
|---|---|---|---|---|
| 2006/0089127 | A1* | 4/2006 | Muratsu | H04L 63/0869 455/411 |
| 2006/0193284 | A1* | 8/2006 | Stieglitz | H04L 63/0492 370/328 |
| 2006/0221919 | A1* | 10/2006 | McRae | H04W 48/16 370/338 |
| 2007/0275701 | A1* | 11/2007 | Jonker | H04W 48/16 455/414.1 |
| 2007/0286143 | A1* | 12/2007 | Olson | H04L 63/1433 370/338 |
| 2008/0136621 | A1* | 6/2008 | Malik | H04W 48/14 340/539.1 |
| 2009/0010399 | A1* | 1/2009 | Kim | H04L 12/2856 379/45 |
| 2011/0142014 | A1* | 6/2011 | Banerjee | H04L 63/0869 370/338 |
| 2011/0149850 | A1* | 6/2011 | Sashihara | H04W 48/16 370/328 |
| 2011/0158127 | A1* | 6/2011 | Duo | H04W 48/16 370/254 |
| 2011/0243112 | A1* | 10/2011 | Misumi | H04W 76/02 370/338 |
| 2013/0308493 | A1* | 11/2013 | Viswanathan | H04W 24/02 370/254 |
| 2014/0241331 | A1* | 8/2014 | Ma | H04W 4/008 370/338 |
| 2015/0043366 | A1* | 2/2015 | Kneckt | H04L 43/0852 370/252 |

FOREIGN PATENT DOCUMENTS

| | | | | |
|---|---|---|---|---|
| JP | 2007-013649 | A | 1/2007 | |
| JP | 2003189351 | B | 9/2007 | |
| KR | 10-2007-0102847 | A | 10/2007 | |
| KR | 10-0951579 | B1 | 4/2010 | |
| KR | 10-2010-0072687 | A | 7/2010 | |
| KR | 10-1405925 | B1 | 6/2014 | |
| WO | 2008/147130 | A2 | 12/2008 | |
| WO | WO 2013063942 | A1 * | 5/2013 | H04W 48/16 |
| WO | 2013/106536 | A2 | 7/2013 | |
| WO | 2013154401 | A1 | 10/2013 | |

OTHER PUBLICATIONS

Draft Amendment to Standard for Information Technology—Telecommunications and Information Exchange Between Systems—LAN/MAN Specific Requirements, Part 11: Wireless Medium Access Control (MAC) and physical layer (PHY) specifications, Amendment 9: Radio Resource Measurement, Mar. 2006, New York, NY, 188 pages, p. i-xviii and p. 1-157.
Obay H. Sabrie et al., "Fast Handoff for 802.11 Wireless Network," Scientific Research, Communications and Network, 2011, pp. 250-256, vol. 3.
Jae Seung Lee et al., "Selective transmission of the Probe Response for 11ai Spec Framework," ETRI, May 2012, pp. Slide 1-Slide 22.
International Search Report of PCT/KR2013/004945 dated Nov. 1, 2013.
Written Opinion of the International Searching Authority of PCT/KR2013/004945 dated Nov. 1, 2013.
Santosh Abraham et al., Short Beacon, doc.: IEEE 802.11-11/1503R0, Nov. 2011, Qualcomm Inc.
David Halasz et al., Frequency Hoping Review and IEEE 802.11ah, doc.: IEEE 802.11-10/1457R0, Dec. 15, 2010, OakTree Wireless.

* cited by examiner

FIG. 2

| ORDER | INFORMATION | NOTES |
|---|---|---|
| 1 | SSID | if dot11MeshActivated is true. the SSID element is the wildcard value as described in 8.4.2.2 |
| 2 | Supported rates | |
| 3 | Request information | The Request element is optionally present if dot11MultiDomainCapabilityActivated is true. |
| 4 | Extended Supported Rates | The Extended Supported Rates element is present if there are more than eight supported rates, and is optionally present otherwise. |
| 5 | DSSS Parameter Set | The DSSS Parameter Set element is present within Probe Request frames generated by STAs using Clause 16, Clause 17, or Clause 19 PHYs if dot11RadioMeasurementActivated is true. The DSSS Parameter Set element is present within Probe Request frames generated by STAs using a Clause 20 PHY in the 2.4 GHz band if dot11 RadioMeasurementActivated i s true.<br><br>The DSSS Parameter Set element is optionally present within Probe Request frames generated by STAs using Clause 16, Clause 17, or Clause 19 PHYs if dot11RadioMeasurementActivated is false. The DSSS Parameter Set element is optionally present within Probe Request frames generated by STAs using a Clause 20 PHY in the 2.4 GHz band if dot11 RadioMeasurementActivated is false. |
| 6 | Supported Operating Classes | The Supported Operating Classes element is present if dot11ExtendedChannelSwitch Activated is true. |
| 7 | HT Capabilities | The HT Capabilities element is present when dot11HighThroughputOptionImplemented attribute is true. |
| 8 | 20/40 BSS Coexistence | The 20/40 BSS Coexistence element is optionally present when the dot112040BSSCoexistenceManagementSupport attribute is true. |
| 9 | Extended Capabilities | The Extended Capabilities element is optionally present if any of the fields in this element are nonzero. |
| 10 | SSID List | The SSID List element is optionally present if dot11MgmtOptionSSIDListActivated is true. |
| 11 | Channel Usage | The Channel Usage element is optionally present if dot11MgmtOptionChannelUsageActivated is true. |
| 12 | Interworking | The Interworking element is present if dot11InterworkingServiceActivated is true. |
| 13 | Mesh ID | The Mesh ID element is present if dot11MeshActivated is true. |
| Last | Vendor Specific | One or more vendor-specific elements are optionally present These elements follows all other elements. |

FIG. 3A

| ORDER | INFORMATION | NOTES |
|---|---|---|
| 1 | Timestamp | |
| 2 | Beacon interval | |
| 3 | Capability | |
| 4 | SSID | |
| 5 | Supported rates | |
| 6 | FH Parameter Set | The FH Parameter Set information element is present within Probe Response frames generated by STAs using FH PHYs. |
| 7 | DS Parameter Set | The DS Parameter Set information element is present within Probe Response frames generated by STAs using Clause 15, Clause 18, and Clause 19 PHYs. |
| 8 | CF Parameter Set | The CF Parameter Set information element is present only within Probe Response frames generated by APs supporting a PCF. |
| 9 | IBSS Parameter Set | The IBSS Parameter Set information element is present only within Probe Response frames generated by STAs in an IBSS. |
| 10 | Country | Included if dot11MultiDomainCapabilityEnabled or dot11SpectrumManagementRequired is true. |
| 11 | FH Parameters | FH Parameters, as specified in 7.3.2.10, may be included if dot11MultiDomainCapabilityEnabled is true. |
| 12 | FH Pattern Table | FH Pattern Table information, as specified in 7.3.2.11, may be included if dot11MultiDomainCapabilityEnabled is true. |
| 13 | Power Constraint | Shall be included if dot11SpectrumManagementRequired is true. |
| 14 | Channel Switch Announcement | May be included if dot11SpectrumManagementRequired is true. |

FIG. 3B

| ORDER | INFORMATION | NOTES |
|---|---|---|
| 15 | Quiet | May be included if dot11SpectrumManagementRequired is true. |
| 16 | IBSS DFS | Shall be included if dot11SpectrumManagementRequired is true in an IBSS. |
| 17 | TPC Report | Shall be included if dot11SpectrumManagementRequired is true. |
| 18 | ERP Information | The ERP Information element is present within Probe Response frames generated by STAs using ERPs and is optionally present in other cases. |
| 19 | Extended Supported Rates | The Extended Supported Rates element is present whenever there are more than eight supported rates, and it is optional otherwise. |
| 20 | RSN | The RSN information element is only present within Probe Response frames generated by STAs that have dot11RSNAEnabled set to TRUE. |
| 21 | BSS Load | The BSS Load element is present when dot11QosOption- Implemented and dot11QBSSLoadImplemented are both true. |
| 22 | EDCA Parameter Set | The EDCA Parameter Set element is present when dot11QosOptionImplemented is true. |
| Last–1 | Vendor Specific | One or more vendor-specific information elements may appear in this frame. This information element follows all other information elements, except the Requested Information elements. |
| Last–n | Requested information elements | Elements requested by the Request information element of the Probe Request frame. |

FIG. 4
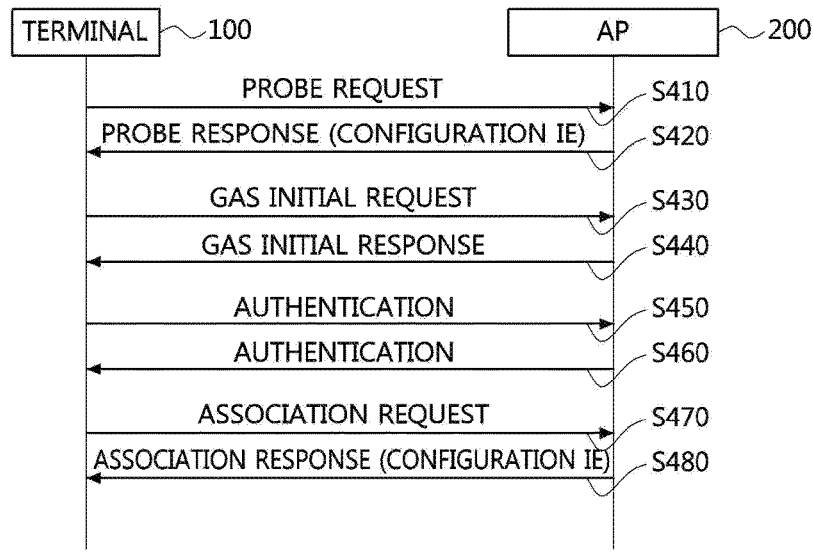
FIG. 5
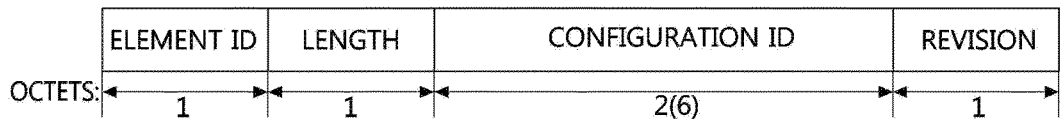
FIG. 6
| ORDER | INFORMATION |
|---|---|
| 1 | SSID |
| 2 | CONFIGURATION IE |
FIG. 7
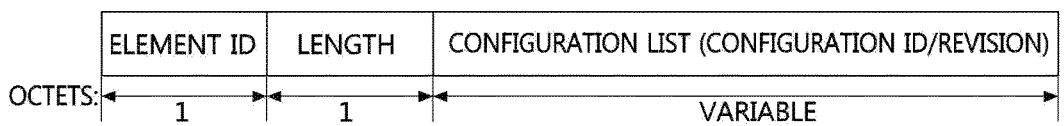

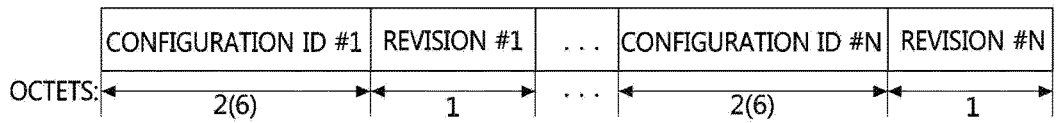

METHOD OF ACTIVE SCANNING AND ASSOCIATING BASED ON CONFIGURATION INFORMATION

TECHNICAL FIELD

The present invention relates to wireless communication technology, and more particularly, to a method of active scanning and associating based on configuration information that can improve radio channel efficiency and improve the characteristic of an association latency.

BACKGROUND ART

With the development of information communication technologies, a variety of wireless communication technologies have been developed. Among these technologies, wireless local area network (WLAN) is a technology that Internet access is possible in a wireless way in homes, business or specific service providing areas, using portable terminal such as personal digital assistant (PDA), a laptop computer, a portable multimedia player (PMP), or the like, based on wireless frequency technologies.

WLAN technologies is created and standardized by the IEEE 802.11 Working Group under IEEE 802 Standard Committee. IEEE 802.11a provides a maximum PHY data rate of 54 Mbps using an 5 GHz unlicensed band. IEEE 802.11b provides a maximum PHY data rate of 11 Mbps by applying a direct sequence spread spectrum (DSSS) modulation at 2.4 GHz. IEEE 802.11g provides a maximum PHY data rate of 54 Mbps by applying orthogonal frequency division multiplexing (OFDM) at 2.4 GHz. IEEE 802.11n provides a PHY data rate of 300 Mbps using two spatial streams and bandwidth of 40 MHz, and provides a PHY data rate of 600 Mbps using four spatial streams and bandwidth of 40 MHz.

As such WLAN technology becomes more prevalent and its applications become more diverse, there is increasing demand for new WLAN technology that can support a higher throughput than IEEE 802.11n. Very high throughput (VHT) WLAN technology, that is one of the IEEE 802.11 WLAN technologies, is proposed to support a data rate of 1 Gbps and higher. IEEE 802.11ac has been developed as a standard for providing VHT in the 5 GHz band, and IEEE 802.11ad has been developed as a standard for providing VHT in the 60 GHz band.

In order for a conventional wireless LAN terminal to connect to an access point (AP), a step of searching for a desired AP, that is, a probe request and probe response step, a detailed network searching step in the searched AP, and a link level authentication and association step in the AP, have to be performed.

Meanwhile, the probe request and probe response step that is used in the step of searching for the AP may request and provide basic information for searching and connection.

However, in environments where a large number of terminals and APs are operating simultaneously, a significantly large number of probe requests and responses are generated. In this case, unnecessary radio channel occupancy may be caused by data with a long length due to a significantly large number of pieces of information in the probe response, and the unnecessary radio channel occupancy deteriorate the channel efficiency.

In addition, when simultaneously retrieving a large number of APs using an service set identifier (SSID) list, there is a problem in that it takes a long time to receive the probe response from the desired APs.

DISCLOSURE

Technical Problem

The present invention is directed to providing a method of active scanning and associating based on configuration information, which can be performed by a terminal to enable quick search for an access point (AP) and quick connection with a desired AP.

The present invention is also directed to providing a method of active scanning and associating based on configuration information, which can be performed by an AP to enable quick search for the AP and quick connection with a desired AP.

Technical Solution

One aspect of the present invention provides an active scanning and associating method that is performed by a terminal, the active scanning and associating method including: transmitting, to an access point (AP), a probe request frame including revision information of a current configuration; and receiving, from the AP, a probe response frame including the current configuration's revision information and/or updated configuration information if any change has been occurred in a configuration designated by the prior revision information.

Here, the configuration may include AP configuration information concerning association with the AP.

In addition, the configuration may include network configuration information of the AP.

Another aspect of the present invention provides an active scanning and associating method that is performed by an AP, the active scanning method including: receiving, from a terminal, a probe request frame including revision information of a configuration stored in the terminal; and transmitting, to the terminal, a probe response frame including the current configuration's revision information and/or updated configuration information if any change has been occurred in a configuration designated by the prior revision information received from the terminal.

Here, the configuration may include AP configuration information concerning association with the AP.

In addition, the configuration may include network configuration information of the AP.

Advantageous Effects

According to a method of active scanning and associating based on configuration information, a probe request frame including revision information of a current configuration may be transmitted to an access point (AP), and a probe response frame including a configuration information element that is composed of the revision information, which are changed from a configuration designated by the revision information, may be received from the AP.

Therefore, when there exist a plurality of terminals and APs, radio channel efficiency can be improved by reducing the number and the length of unnecessary probe request frames and probe response frames to search for the AP. In addition, when information of network connected to the AP is not changed, the characteristic of an association latency can be improved by eliminating a GAS process.

DESCRIPTION OF DRAWINGS

FIG. 2 shows a format of a probe request frame used in active scanning;

FIG. 3A shows a partial format of a probe response frame used in active scanning;

FIG. 3B shows the remaining format of a probe response frame used in active scanning;

FIG. 4 is a flowchart showing an initial association process according to an embodiment of the present invention;

FIG. 5 shows a format of a configuration information element that is included in the Probe Response frame according to an embodiment of the present invention;

FIG. 6 shows a short probe request frame body format that is transmitted at the time of searching for an access point (AP) having a previous association history according to an embodiment of the present invention;

FIG. 7 shows a configuration list information element that is included in Probe Response frame when searching for a plurality of APs which the terminals has associated with previously according to an embodiment of the present invention;

FIG. 8 shows a format of a configuration list field included in the configuration list information element of FIG. 7;

FIG. 9 shows a short probe request frame body format composed of a service set identifier (SSID) list and a configuration list according to an embodiment of the present invention;

FIG. 10 shows a short probe response frame body format according to an embodiment of the present invention;

FIG. 11 shows a short probe response frame body format including changed information elements according to an embodiment of the present invention;

MODE FOR INVENTION

Figure 1:
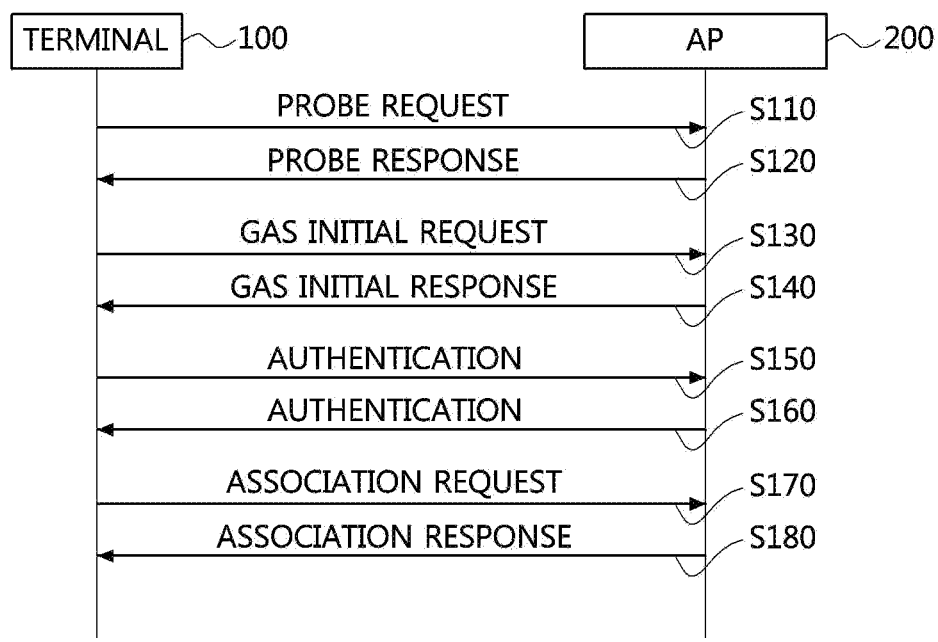
FIG. 1 is a flowchart showing an association process of a wireless local area network (WLAN) terminal.

Hereinafter, exemplary embodiments of the present invention will be described in detail. However, the present invention is not limited to the exemplary embodiments disclosed below, but can be implemented in various forms. The following exemplary embodiments are described in order to enable those of ordinary skill in the art to embody and practice the invention.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used here, the term □and/or□ includes any and all combinations of one or more of the associated listed items.

It will be understood that when an element is referred to as being □connected□ or □coupled□ to another element, it can be directly connected or coupled to the other element or intervening elements may be present. In contrast, when an element is referred to as being □directly connected□ or □directly coupled□ to another element, there are no intervening elements present.

The terminology used herein is for the purpose of describing particular embodiments only and is not intended to be limiting of the invention. As used herein, the singular forms □a, □an□ and □the□ are intended to include the plural forms as well, unless the context clearly indicates otherwise. It will be further understood that the terms □comprises,□ □comprising,□ □includes□ and/or □including,□ when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined here.

Hereinafter, preferred embodiments of the present invention will be described in detail with reference to the accompanying drawings. In the drawings and description, elements that appear in more than one drawing and/or elements that are mentioned in more than one place in the description are always denoted by the same respective reference numerals and are not described in detail more than once.

In the specification, station (STA) denotes an arbitrary functional medium including a medium access control (MAC) layer defined by the Institute of Electrical and Electronics Engineers (IEEE) 802.11 standard, and a physical layer interface with respect to a wireless medium. STAs may be divided into STAs that are access points (APs) and STAs that are not APs. An STA that is an AP may be simply referred to as an AP, and an STA that is not an AP may be simply referred to as a terminal. The terminal may include a processor and a transceiver, and may further include a user interface, a display device, and the like. The processor denotes a unit that is designed to generate a frame to be transmitted through a wireless network or process a frame received through the wireless network, and performs a variety of functions for controlling the station (STA). The transceiver may be functionally connected with the processor, and denotes a unit that is designed to transmit and receive a frame through the wireless network for the STA.

The AP may refer to a centralized controller, a base station (BS), a Node-B, an eNode-B, a base transceiver system, a site controller, or the like, and may include some or all functions thereof.

The terminal may refer to a wireless transmit/receive unit (WTRU), user equipment (UE), a user terminal (UT), an access terminal (AT), a mobile station (MS), a mobile terminal, a subscriber unit, a subscriber station (SS), a wireless device, a mobile subscriber unit, or the like, and may include some or all functions thereof.

Here, the terminal may be a desktop computer enabling communication, a laptop computer, a tablet PC, a wireless phone, a mobile phone, a smart phone, an e-book reader, a portable multimedia player (PMP), a portable game console, a navigation device, a digital camera, a digital multimedia broadcasting (DMB) player, a digital audio recorder, a digital audio player, a digital picture recorder, a digital picture player, a digital video recorder, a digital video player, or the like.

A scanning and associating method based on configuration information according to an embodiment of the present invention, which will be described later, may be applied to the above-described IEEE 802.11 wireless local area network (WLAN) system. It may further be applied to a variety of networks such as a wireless personal area network (WPAN), a wireless body area network (WBAN), and the like, as well as the IEEE 802.11 WLAN system.

FIG. 1 is a flowchart showing an association process of a WLAN terminal, and FIGS. 2, 3A, and 3B are formats of a probe request frame and a probe response frame, which are used in active scanning.

Referring to FIG. 1, in step S110, a terminal 100 broadcast a probe request frame to search fot the AP 200.

In step S120, when the probe request frame is received through step S110, the AP 200 transmits a probe response frame to the terminal 100 in response to the probe request frame.

Here, the probe request frame shown in FIG. 2 is used in step S110, and the probe response frame shown in FIGS. 3A and 3B is used in step S120.

In step S130, when the probe response frame is received from the AP 200 through step S120, the terminal 100 transmits a generic advertisement service (GAS) initial request message to the AP 200 in order to get more detailed network service information provided by the AP 200.

In step S140, the AP 200 transmits a GAS initial response message corresponding to the GAS initial request message to the terminal 100.

When the GAS initial response message is received from the AP 200 through step S140, the terminal 100 performs authentication.

Here, the authentication is a process of proving, by the terminal 100 that has selected the AP 200, that the terminal 100 is a valid terminal with respect to the AP 200. That is, the authentication is a process of negotiating an authentication procedure and cryptography with the AP.

Specifically, in step S150, the terminal 100 transmits an authentication request message to the AP 200.

In step S160, when the authentication request message is received through step S150 and the terminal 100 is determined to be the valid terminal, the AP 200 transmits an authentication response message corresponding to the authentication request message to the terminal 100.

Here, an open system authentication method is used in most cases, and therefore the AP 200 unconditionally performs authentication in response to the authentication request from the terminal 100.

Next, the terminal 100 and the AP 200 successfully complete the authentication, and then perform an association process in which the terminal is connected to the AP 200.

The association process is a process of setting identifiable association information between the terminal 100 and the AP 200, and when the association process is completed, the terminal may communicate with other terminals via the AP 200.

Specifically, in step S170, when the authentication response message is received, the terminal 100 transmits an association request message to the AP 200 in order to connect to the AP 200.

In step S180, when the association request message is received from the terminal 100 through step S170, the AP 200 transmits, to the terminal 100, an association response message including an association ID (AID) that can be distinguished from other terminals.

As described above, when performing the association process of the WLAN terminal, as shown in FIG. 1, a large number of probe request frames and probe response frames are generated in environments with a large number of terminals and APs, and therefore unnecessary radio channel occupancy may be caused, resulting in deterioration in the channel efficiency. In particular, since the probe response frame has a significantly large number of pieces of information, as shown in FIGS. 3A and 3B, a length of data may be increased, resulting in deterioration in the channel efficiency.

In addition, when simultaneously retrieving a large number of APs using a service set identifier (SSID) list, there is a problem in that takes a long time to receive all the probe response frames from the desired APs.

In general, configuration parameters and setting values for association with an AP are not frequently changed. Accordingly, an embodiment of the present invention utilize the feature which is unnecessary to request and receive all information concerning probe request and probe response from the AP having a history of being associated once. Hereinafter, the feature will be described.

Accordingly, hereinafter, an embodiment of the present invention utilizing the feature that it is unnecessary to request and receive, from the AP having a history of being associated once, all information concerning probe request and probe response in a process of retrieving the AP will be described.

FIG. 4 is a flowchart showing an initial association process according to an embodiment of the present invention.

Referring to FIG. 4, the terminal 100 and the AP 200 perform a similar process with the association process of the WLAN terminal shown in FIG. 1 for association with the WLAN terminal.

However, unlike the association process of the WLAN terminal shown in FIG. 1, the AP 200 enables a configuration information element (IE) for managing current association configuration information and network information of the AP 200 to be included in the probe response frame transmitted through step S420, and transmits the probe response frame to the terminal 100.

Alternatively, the AP 200 enables the configuration IE for managing current association configuration information and network information of the AP 200 to be included in an association response transmitted through step S480, and transmits the association response to the terminal 100.

Hereinafter, a format for the configuration information element will be described with reference to FIG. 5.

Referring to FIG. 5, the configuration IE includes a configuration ID for managing current association configuration information and network information of the AP 200 and revision information.

Here, the configuration ID may be unique to each AP or to each group for sharing the same association information and network information, and may be generated in the form of a globally unique identifier (GUID) with a length of 16 bytes.

In addition, the AP 200 increases a revision whenever the association information and network information of the AP 200 are changed.

When the information of the AP 200 is changed enough not to be associated with an existing revision (for example, factory initialization or the like), the AP 200 may set a revision value as an initial value (e.g, 0).

The terminal 100 stores an AP association profile together with the configuration IE upon successful association with the AP 200.

In addition, when the configuration IE is unique to each AP, a basic service set ID (BSSID) of the AP may be used for the configuration ID.

Here, the BSSID may be easily inferred from a medium access control (MAC) address of the corresponding AP, and therefore a configuration ID may be omitted from the configuration IE to be used.

FIG. 6 shows a short probe request frame body format that is transmitted at the time of searching for an AP having a previous association history according to an embodiment of the present invention, FIG. 7 shows a configuration list information element that is included in Probe Response frame when searching for a plurality of APs which the terminal has associated with previously according to an embodiment of the present invention, FIG. 8 shows a format of a configuration list field included in the configuration list information element of FIG. 7, and FIG. 9 shows a short probe request frame body format composed of an SSID list and a configuration list according to an embodiment of the present invention.

First, referring to FIG. 6, the terminal 100 may transmit, to the AP 200, a short probe request frame including an SSID and a configuration IE as shown in FIG. 6 for association with the AP 200 having a previous association history.

Here, when the configuration IE is unique to each group, the APs whose information is the same as the SSID and configuration information ID included in the probe request frame, among the APs that have received the probe request frame, may transmit the probe response frame to the terminal 100.

Alternatively, when the configuration IE is unique to each AP, the configuration information ID may be replaced with the BSSID of the AP.

In general, the terminal 100 may broadcast the probe request frame without a reception address, but perform unicast-transmission using an MAC address of the corresponding AP instead of the reception address of the probe request frame to search for a specific AP.

Here, the AP 200 may easily infer the configuration information ID from the reception address of the probe request frame, and therefore the terminal may eliminate the configuration information ID from the configuration IE.

Referring to FIG. 7, the configuration list information element transmitted at the time of searching for the plurality of APs having a previous association history may include a configuration list having an element ID, a length, and a configuration ID and/or revision.

Here, a configuration list format may be configured as shown in FIG. 8.

The terminal 100 may configure and use a short probe request frame including an SSID list having a plurality of SSIDs, and a configuration list information element having a plurality of configuration IDs and revision fields, in order to simultaneously retrieve a plurality of APs having a previous association history.

Alternatively, the terminal may configure a short probe request frame including a configuration list IE having one specific SSID, and a plurality of IDs/revisions in the SSID list shown in FIG. 9, in order to simultaneously retrieve a plurality of APs having the same SSID and having a previous association history.

In addition, when the configuration IE is unique to each AP, the terminal 100 may eliminate the SSID list shown in FIG. 9 to simultaneously retrieve the plurality of APs, and configure the probe request frame only using the configuration list.

Here, AP, that has received the probe request frame which the SSID list is eliminated, may transmit the probe response frame to the terminal, when AP□s own configuration ID (BSSID) is included in the configuration list.

FIG. 10 shows a short probe response frame body format according to an embodiment of the present invention, and FIG. 11 shows a short probe response frame body format including changed information elements according to an embodiment of the present invention.

Referring to FIGS. 10 and 11, the AP 200 may transmit a short probe response frame corresponding to the short probe request frame received from the terminal 100 as described in FIGS. 6 to 9.

Here, when there is no changed information compared to a configuration IE included in the received short probe request frame, the AP 200 may transmit only timestamp, SSID, and configuration IE, instead of transmitting all of the information.

Alternatively, when there is a change in a setting value of the AP compared to the configuration IE included in the received short probe request frame, the AP 200 may enable only an updated IE value to be included in the probe response frame, compared to a previous revision, together with the latest configuration IE, and transmit the probe response frame to the terminal 100.

Here, IEs which are constantly changed over time regardless of fixed setting of the AP 200 may be additionally included in the short probe response frame.

Alternatively, when there is a significant change such as initialization of a setting value of the AP compared to the configuration IE included in the received short probe request frame, the AP 200 may transmit a full probe response frame in which a configuration revision is set as 0 instead of transmitting the probe response frame.

Here, when the probe response frame, in which a revision field value of the configuration IE is set as 0, is received from the AP 200, the terminal 100 may update existing association information based on the received probe response frame.

Therefore, according to an embodiment of the present invention, radio channel use efficiency can be improved by reducing the number and the length of unnecessary probe request frames and probe response frames to search for the AP.

In addition, when there is no change in the network information connected to the AP, an association speed can be improved by eliminating a GAS process.

Figure 12:
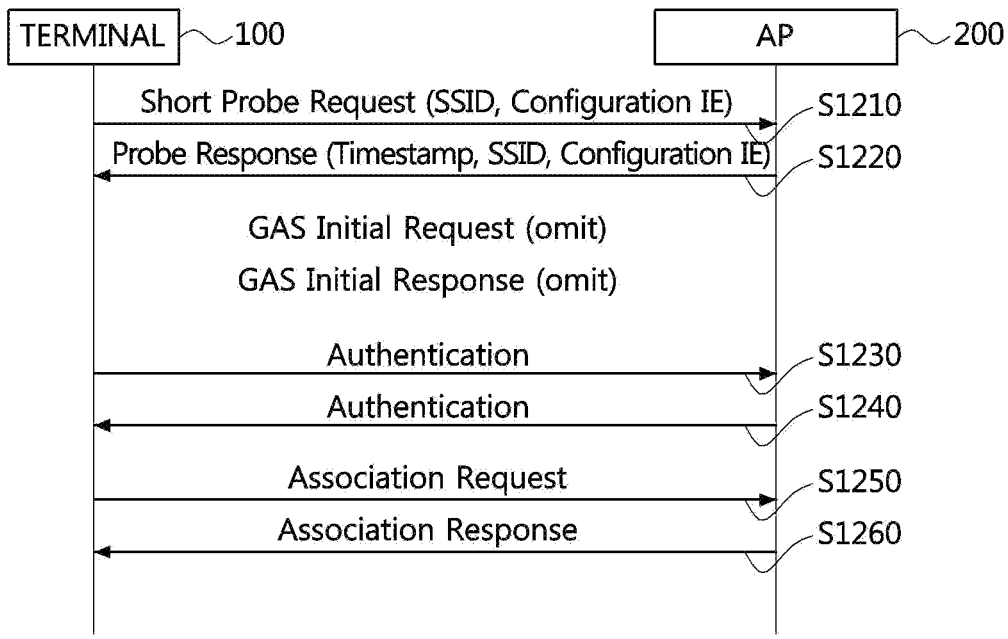
FIG. 12 is a flowchart showing a association process between a terminal, which has associated with the AP previously, and an AP according to an embodiment of the present invention.

FIG. 12 is a flowchart showing a association process between a terminal, which has associated with the AP previously, and an AP according to an embodiment of the present invention.

Referring to FIG. 12, in step S1210, the terminal 100 transmits, to the AP 200, a short probe request frame including an SSID and a configuration IE as shown in FIG. 6, in order to be associated with the AP 200 having a previous association history.

In step S1220, when there is no changed information compared to the configuration IE included in the short probe request frame received from the terminal 100 through step S1210, the AP 200 transmits, to the terminal 100, the short probe response frame including only a timestamp, the SSID, and the configuration IE, instead of transmitting the entire information.

Next, in the same manner as an existing method, the terminal 100 may perform an authentication process S1230 and S1240 and an association process S1250 and S1260.

Here, when there is no change in the configuration IE received from the AP through step S1220, the terminal 100 may eliminate a network searching process (GAS/ANQP) as shown in FIG. 12.

Therefore, according to an embodiment of the present invention, radio channel efficiency can be improved by reducing the number and the length of unnecessary field in probe request frames and probe response frames to search for the AP.

In addition, when there is no change in the network information connected to the AP, an association speed can be improved by eliminating a GAS process.

Figure 13:
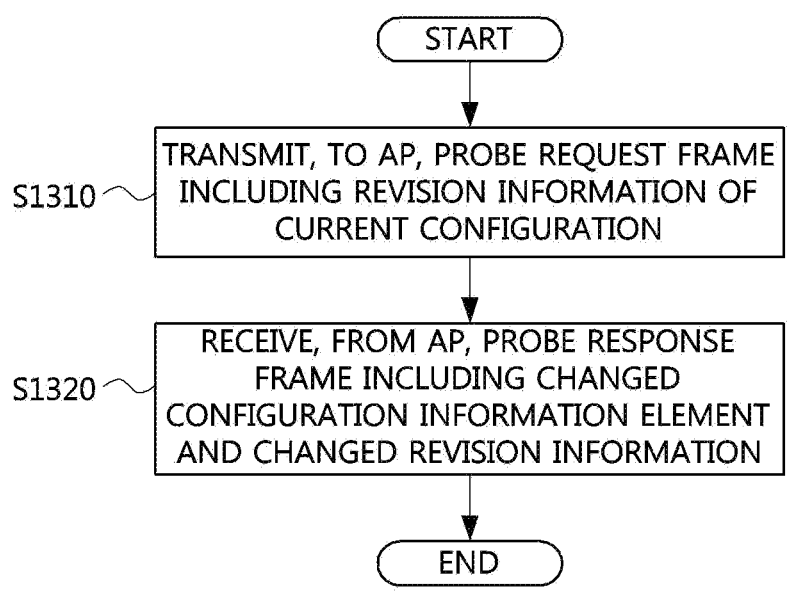
FIG. 13 is a flowchart showing an active scanning and associating process based on configuration information which is performed in a terminal according to an embodiment of the present invention.

FIG. 13 is a flowchart showing an active scanning and associating process based on configuration information, which is performed in a terminal according to an embodiment of the present invention.

Referring to FIG. 13, in step S1310, the terminal transmits, to the AP 200, a probe request frame including revision information of a current configuration.

Here, the configuration may include AP configuration information concerning association with the AP 200.

In addition, the configuration may include network configuration information of the AP 200.

Next, in step S1320, the terminal receives, from the AP 200, a probe response frame including the current configuration's revision information and/or updated configuration information if any change has been occurred in a configuration designated by the prior revision information.

Therefore, according to an embodiment of the present invention, radio channel use efficiency can be improved by receiving the probe response frame including the current configuration's revision information and/or updated configuration information instead of receiving an existing full probe response frame.

Figure 14:
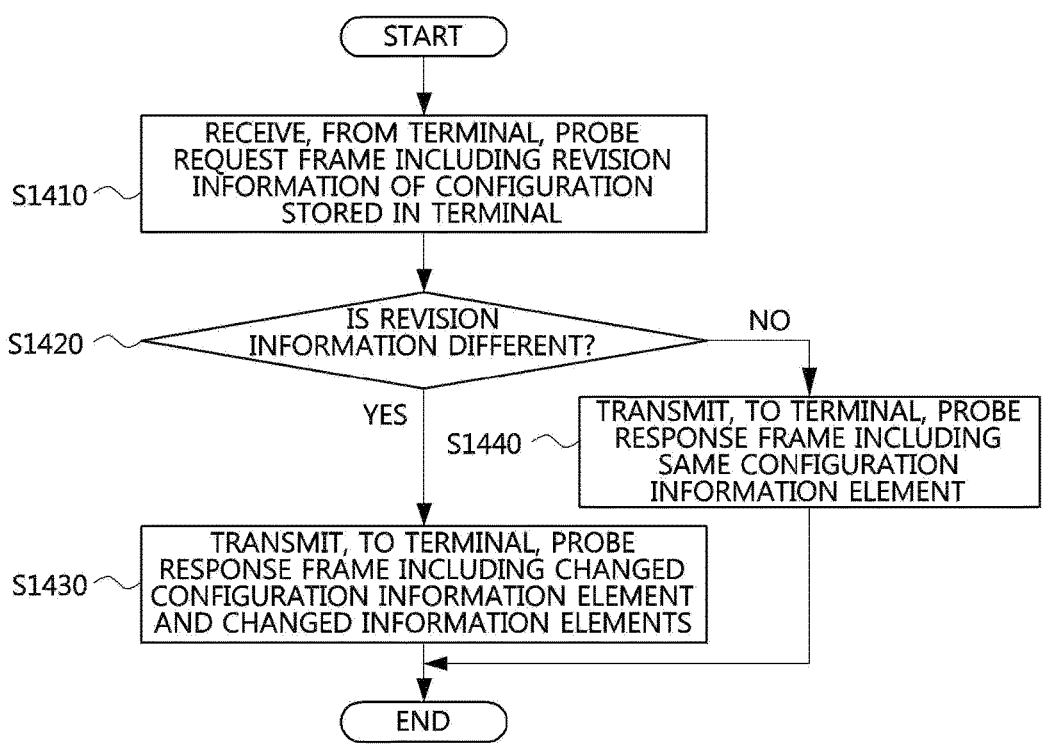
FIG. 14 is a flowchart showing an active scanning and associating process based on configuration information which is performed in an AP according to an embodiment of the present invention.

FIG. 14 is a flowchart showing an active scanning and associating process based on configuration information which is performed in an AP according to an embodiment of the present invention.

Referring to FIG. 14, in step S1410, the AP 200 receive, from the terminal 100, a probe request frame including revision information of a configuration stored in the terminal.

Here, the configuration may include AP configuration information concerning association with the AP 200.

Here, the configuration may include network configuration information of the AP 200.

Next, in step S1420, the AP 200 may determine whether the configuration designated by the revision information is different from current revision information of a configuration of the AP 200.

In step S1430, when it is determined, through step S1420, that the configuration designated by the revision information is different from the revision information of the current configuration of the AP 200, the AP 200 transmits, to the terminal 100, the probe response frame including a current configuration IE and changed IEs, which are changed from the configuration designated by the revision information received from the terminal 100.

Alternatively, in step S1440, when it is determined, through step S1420, that the configuration designated by the revision information is the same as the revision information of the configuration of the AP 200, the AP 200 transmits, to the terminal 100, the probe response frame including the same configuration IE.

Therefore, according to an embodiment of the present invention, radio channel efficiency can be improved by reducing the number and the length of unnecessary field in probe request frames and probe response frames to search for an AP.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. A method by a terminal for performing active scanning, the method comprising:
   transmitting, to an access point (AP), a probe request frame including revision information of a configuration stored in the terminal;
   receiving, from the AP, a probe response frame in response to the probe request frame and prior to requesting an association with the AP,
   wherein the probe response frame includes current revision information of the AP and a time stamp of the AP when the revision information included in the probe request frame and the current revision information of the AP are identical,
   wherein the probe response frame includes the current revision information of the AP and only information elements required to be updated by the terminal when the revision information included in the probe request frame and the current revision information of the AP are not identical, and
   transmitting an association request frame to the AP after receiving the probe response frame,
   wherein the revision information indicates a change of the configuration of the AP, and
   wherein a value of the revision information increments by the AP when the configuration of the AP is changed.

2. The method of claim 1, wherein the configuration includes at least one of configuration information on an associating with the AP or network configuration information of the AP.

3. The method of claim 1, wherein when the revision information included in the probe request frame and the current revision information of the AP are identical, the probe response frame further includes information elements which are changed over time.

4. The method of claim 1, wherein the revision information is defined as 1 octet in size.

5. The method of claim 1, wherein the probe request frame further includes Basic Service Set ID (BSSID) information of the AP.

6. A method by an access point (AP) for responding to active scanning, the method comprising:
   receiving, from a terminal, a probe request frame including revision information of a configuration stored in the terminal;
   transmitting, to the terminal, a probe response frame in response to the probe request frame and prior to requesting an association with the terminal,
   wherein the probe response frame includes current revision information of the AP and a time stamp of the AP when the revision information included in the probe request frame and the current revision information of the AP are identical, wherein the probe response frame includes the current revision information of the AP and only information elements required to be updated by the terminal when the revision information included in the probe request frame and the current revision information of the AP are not identical, and receiving an association request frame from the terminal after transmitting the probe response frame, wherein the revision information indicates a change of the configuration of the AP, and wherein a value of the revision information increments by the AP when the configuration of the AP is changed.

7. The method of claim 6, wherein the configuration includes at least one of configuration information on associating with the AP or network configuration information of the AP.

8. The method of claim 6, wherein when the revision information included in the probe request frame and the current revision information of the AP are identical, the probe response frame further includes information elements which are changed over time.

9. The method of claim 6, wherein the revision information is defined as 1 octet in size.

10. The method of claim 6, wherein the probe request frame further includes Basic Service Set ID (BSSID) information of the AP.

11. A terminal for performing active scanning, the terminal comprising:
a transceiver; and
a processor,
wherein the processor is configured to:
transmit, using the transceiver, to an access point (AP), a probe request frame including revision information of a configuration stored in the terminal;
receive, using the transceiver, from the AP, a probe response frame in response to the probe request frame and prior to requesting an association with the AP,
wherein the probe response frame includes current revision information of the AP and a time stamp of the AP when the revision information included in the probe request frame and the current revision information of the AP are identical, wherein the probe response frame includes the current revision information of the AP and only information elements required to be updated by the terminal when the revision information included in the probe request frame and the current revision information of the AP are not identical, and transmit an association request frame to the AP after receiving the probe response frame, wherein the revision information indicates a change of the configuration of the AP, and wherein a value of the revision information increments by the AP when the configuration of the AP is changed.

12. An access point (AP) for responding to active scanning, the AP comprising:
a transceiver; and
a processor,
wherein the processor is configured to:
receive, using the transceiver, from a terminal, a probe request frame including revision information of a configuration stored in the terminal; and
transmit, using the transceiver, to the terminal, a probe response frame in response to the probe request frame and prior to requesting an association with the terminal,
wherein the probe response frame includes current revision information of the AP and a time stamp of the AP when the revision information included in the probe request frame and the current revision information of the AP are identical, wherein the probe response frame includes the current revision information of the AP and only information elements required to be updated by the terminal when the revision information included in the probe request frame and the current revision information of the AP are not identical, and receive an association request frame from the terminal after transmitting the probe response frame, wherein the revision information indicates a change of the configuration of the AP, and wherein a value of the revision information increments by the AP when the configuration of the AP is changed.

* * * * *